(12) United States Patent
Zou

(10) Patent No.: US 6,256,698 B1
(45) Date of Patent: Jul. 3, 2001

(54) METHOD OF AND APPARATUS FOR PROVIDING SELF-SUSTAINED EVEN ARBITRATION WITHIN AN IEEE 1394 SERIAL BUS NETWORK OF DEVICES

(75) Inventor: Feng Zou, Milpitas, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/227,951

(22) Filed: Jan. 11, 1999

(51) Int. Cl.$^7$ ..................................................... G06F 13/36
(52) U.S. Cl. ........................... 710/113; 710/40; 710/240; 710/241; 710/244
(58) Field of Search ................................. 710/113, 115, 710/240, 241, 244, 40, 43; 395/601

(56) References Cited

U.S. PATENT DOCUMENTS

| | | | |
|---|---|---|---|
| 4,739,323 | 4/1988 | Miesterfeld et al. | 340/825.5 |
| 5,485,458 | 1/1996 | Oprescu et al. | 370/85.2 |
| 5,495,481 | 2/1996 | Duckwall | 370/85.2 |
| 5,574,911 | * 11/1996 | D'Angelo et al. | 395/601 |
| 5,596,749 | 1/1997 | Cantrell et al. | 395/673 |
| 5,621,898 | 4/1997 | Wooten | 395/297 |
| 5,630,173 | 5/1997 | Oprescu | 395/860 |

FOREIGN PATENT DOCUMENTS

| | | | |
|---|---|---|---|
| 0 715 257 A1 | 5/1996 | (EP) | G06F/9/46 |
| WO 97/29242 | * 8/1997 | (WO) | G06F/9/46 |
| WO 97/29424 | 8/1997 | (WO) | G06F/9/46 |

OTHER PUBLICATIONS

Sang–Man Moh et al., "A Bus Arbitration Scheme with Smoothly–Distributed Waiting Time," pp. 850–859, Electronics and Telecommunications Research Institute.

Michael Teener, "A Bus on a Diet –The Serial Bus Alternative. An Introduction to the P1394 High Performance Serial Bus." pp. 316–321, Feb. 24, 1992, XP 000340753, IEEE.

Peram Marimuthu, "An Exact Analysis of Prioritized Bus Arbitration Protocol," pp. 311–314, Wandel & Goltermann Technologies Research Triangle Park, NC 27709.

Fayez El Guibaly, "Design and Analysis of Arbitration Protocols," pp. 161–171, IEEE Transactions on Computers, vol. 38, No. 2, Feb. 1989.

(List continued on next page.)

*Primary Examiner*—Ario Etienne
(74) *Attorney, Agent, or Firm*—Haverstock & Owens LLP

(57) ABSTRACT

A method of providing self-sustained even arbitration within an IEEE 1394-1995 serial bus network of devices controls the arbitration and assignment of newly-connected simpler devices to more complex devices within a network of devices. A priority arbitration formula is preferably used to determine the more complex device within a network of devices which will take assignment of a newly-connected simpler device. Alternatively, a delay time arbitration formula is used to determine the more complex device within the network of devices which will take assignment of a newly-connected simpler device. Using either the priority arbitration formula or the delay time arbitration formula, a more complex device with the lowest number of currently assigned simpler devices is assigned a newly-connected simpler device. If more than one of the more complex devices have an equal number of assigned simpler devices which is the lowest number of currently assigned simpler devices, then the address value of the more complex devices determines which one of the more complex devices with the lowest number of currently assigned simpler devices will take assignment of a newly-connected simpler device.

22 Claims, 4 Drawing Sheets

OTHER PUBLICATIONS

Fayez El Guibaly, "Fair Arbitration Protocols for Communication Networks," Paper No. 85121, Session No. 12, Department of Electrical Engineering, University of Victoria, B.C.

Hussein M. Alnuweiri, "Synchronous Bus Arbitration with Constant Logic Per Module," pp. 35–41, Department of Electrical Engineering University of British Columbia, IEEE 1994.

R.H.J. Bloks, "The IEEE–1394 High Speed Serial Bus," pp. 209–216, Doc. No. XP 000627671, Philips Journal of Research, vol. 50, No. 1/2, 1996.

"P1394 Standard For A High Performance Serial Bus," IEEE, 1995.

* cited by examiner

METHOD OF AND APPARATUS FOR PROVIDING SELF-SUSTAINED EVEN ARBITRATION WITHIN AN IEEE 1394 SERIAL BUS NETWORK OF DEVICES

FIELD OF THE INVENTION

The present invention relates to the field of arbitration among devices. More particularly, the present invention relates to the field of arbitration among separate devices within a network of devices for allocation of a task.

BACKGROUND OF THE INVENTION

The IEEE 1394-1995 standard, "1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin compared to other bulkier cables used to connect such devices. A node on the IEEE 1394-1995 serial bus is considered a logical entity with a unique address on the bus structure. Each node provides an identification ROM, a standardized set of control registers and its own address space.

The IEEE 1394-1995 serial bus provides plug and play capabilities for applications. Devices can be added and removed from an IEEE 1394-1995 bus while the bus is active. If a device is so added or removed the bus will then automatically reconfigure itself for transmitting data between the existing nodes. To control any of these devices, the user must manually operate each device separately through controls on the device. In the alternative, it is well known that infrared control devices exist for a variety of home entertainment type products such as television, VCR, and sound systems. There are even a number of so-called 'universal remote' products available that can control a number of different brands or types of equipment.

If a more capable device with a central processing unit and enough internal memory to run an application, such as a computer system, settop box or a smart television is connected as one of the nodes within the network, then other simpler devices connected to the network may be controlled through one of the more capable devices. In such a configuration, the more capable device runs driving software specific to the particular simpler device which provides an interface to the user and allows the user to control and operate the device through the computer system. This driving software is typically packaged with the device and included on a floppy disk or CD-Rom. The driving software is then loaded into the more capable device by the user as part of the initialization procedure when the simpler device is first connected to the network or to the more capable device directly. For example, when a printer is first connected to a computer system, a user must load the printer driver software on the computer system before the computer system is able to recognize and communicate with the printer. After the printer driver software is loaded on the computer system, the user has the ability to control the operation of the printer through commands entered into the computer system. If the printer driver software is later updated, the user must obtain the software upgrade, again on a floppy disk or CD-Rom, and load it into the computer system. For devices configured for operation with computer systems of different platforms, such as MAC or PC based platforms, multiple disks, each including the driving software and capable of being loaded into one of the available platforms, must be included with the device. Simpler devices are devices such as printers, video cameras, compact disk players, video cassette recorders and stereo receivers, which do not have the capability to host or represent any other device. A simpler device will therefore not have the capability to provide an interface to a user allowing the user to control another device through the interface. A more capable device will have the capability to provide an interface through which a user can control another device.

When a simpler device is connected to an IEEE 1394-1995 serial bus network, the more capable devices within the IEEE 1394-1995 serial bus network must arbitrate amongst themselves to determine which of the more capable devices will represent and control the simpler device. Arbitration is the process of selecting one device from a group of devices which are competing to access a certain resource or to perform a certain operation. Several well-known arbitration protocols are available including equal-priority, fixed-priority, round robin, random-delay and queuing protocols. These protocols are not efficient in an IEEE 1394-1995 serial bus network environment because these available protocols were developed with the assumption that a requesting device only requests a resource when it needs the resource. In the IEEE 1394-1995 serial bus network environment, when a simpler device is connected to the IEEE 1394-1995 serial bus, each of the more capable devices will attempt to represent the simpler device. In this case, if the fixed priority protocol is used to arbitrate and assign the newly connected simpler device to a more capable device, the more capable device with the highest priority will get the newly connected simpler device and will eventually become overloaded while the other lower priority more capable devices will not represent any newly connected simpler devices. An arbitration protocol, such as the round robin protocol, does give each available more capable device an equal opportunity to represent a newly connected simpler device, but does not provide any opportunity for a later connected more capable device to represent the same number of simpler devices as an earlier connected more capable device. Using existing protocols, the arbitration and assignment of newly connected simpler devices will not generate an equal sharing of resources between the available more capable devices within a network of devices and will thus cause inefficiencies and potential delays within the network of devices.

SUMMARY OF THE INVENTION

In one aspect of the present invention, a method of arbitrating responsibility for a task among a plurality of devices comprises the steps of determining a responsibility value for each of the plurality of devices, wherein the responsibility value represents a number of currently assigned tasks for a corresponding one of the plurality of devices, assigning responsibility for the task to one of the plurality of devices having a lowest responsibility value, if only one of the plurality of devices has the lowest responsibility value and assigning responsibility for the task to one of the plurality of devices having the lowest responsibility value based on an address value for each of the plurality of devices having the lowest responsibility value, if more than one of the plurality of devices have the lowest responsibility value.

In another aspect of the present invention, an apparatus for arbitrating responsibility for a task among a plurality of devices comprises means for determining a responsibility value for each of the plurality of devices, wherein the responsibility value represents a number of currently assigned tasks for a corresponding one of the plurality of devices and means for assigning coupled to the means for determining for assigning responsibility for the task to a selective one of the plurality of devices having a lowest responsibility value, if only one of the plurality of devices has the lowest responsibility value, and based on an address value for each of the plurality of devices having the lowest responsibility value, if more than one of the plurality of devices have the lowest responsibility value.

In another aspect of the present invention, a method of arbitrating and assigning responsibility for simpler devices to more complex devices within a network of devices comprises the steps of determining a responsibility value for each of the more complex devices, wherein the responsibility value is equal to a number of currently assigned simpler devices for a corresponding more complex device, determining a priority value for each of the more complex devices based on a corresponding responsibility value and address value for each of the more complex devices and assigning responsibility for a newly-connected simpler device to one of the more complex devices having a highest priority value.

In another aspect of the present invention, a method of arbitrating and assigning responsibility for simpler devices to more complex devices within a network of devices comprises the steps of determining a responsibility value for each of the more complex devices, wherein the responsibility value is equal to a number of currently assigned simpler devices for a corresponding more complex device, determining a delay value based on corresponding responsibility value and address value for each of the more complex devices and assigning responsibility for a newly-connected simpler device to one of the more complex devices having a lowest delay value.

In another aspect of the present invention, a network of devices includes one or more simpler devices and a plurality of more complex devices, wherein each of the more complex devices comprises a network interface component to communicate with other devices within the network of devices and an apparatus to arbitrate and assign responsibility for simpler devices to more complex devices including a determining component for determining a responsibility value for the more complex device, wherein the responsibility value represents a number of simpler devices currently assigned to the more complex device and a controlling component coupled to the determining component for taking assignment of a newly-connected simpler device, if the more complex device has a lowest responsibility value, if only one of the more complex devices has the lowest responsibility value, and having the lowest responsibility value and a highest address value, if more than one of the more complex devices has the lowest responsibility value.

DETAILED DESCRIPTION OF THE PREFERRED EMBODIMENT

Figure 1:
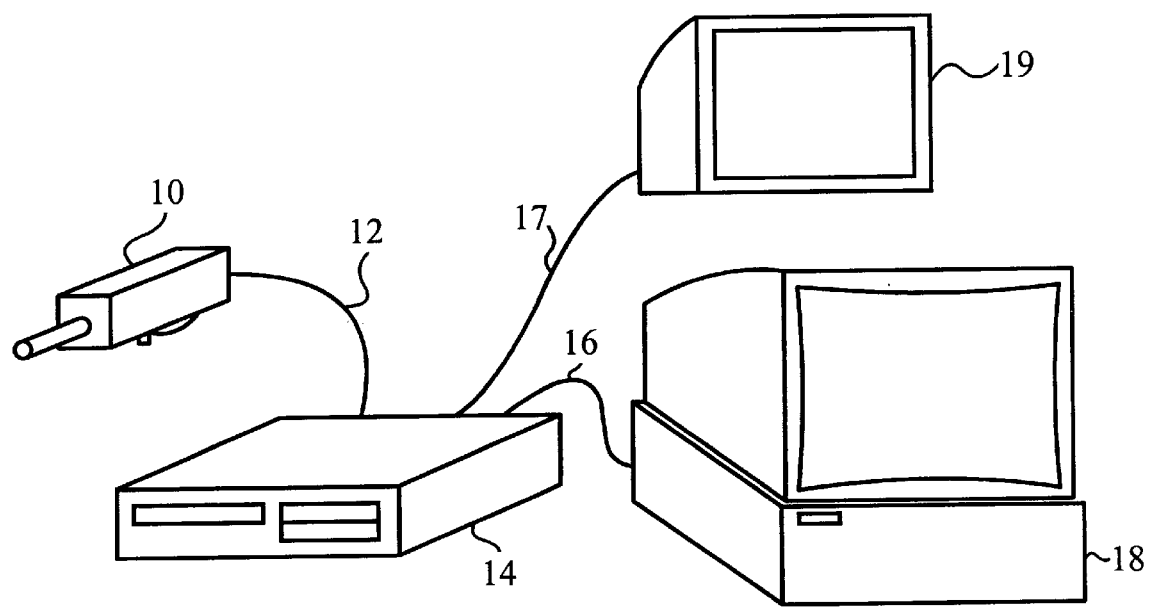
FIG. 1 illustrates an exemplary network configuration of devices including a computer system, a smart television, a video camera and a video cassette recorder.

A method of providing self-sustained even arbitration within an IEEE 1394-1995 serial bus network of devices controls the arbitration and assignment of newly-connected simpler devices to more complex devices. For the purposes of the description of the present invention, more complex devices are devices which have the capability to host or represent other devices. Accordingly, a more capable device will have the capability to provide an interface through which a user can control another device. Examples of more complex devices are a computer system, settop box and a smart television. For the purposes of the description of the present invention, simpler devices are devices which do not have the capability to host or represent other devices. Accordingly, a simpler device will not have the capability to provide an interface to a user, allowing the user to control another device through the interface. Examples of simpler devices are a printer, video camera, compact disk player, video cassette recorder and stereo receiver.

Preferably, a priority arbitration formula is used to determine the more complex device within an IEEE 1394-1994 serial bus network of devices which will take assignment of a newly-connected simpler device. Using the priority arbitration formula, each more complex device calculates a priority value, based on its number of currently assigned simpler devices and address value within the network of devices. After each of the more complex devices calculates its priority value, the more complex device within the network of devices having the highest priority value takes assignment of the newly-connected simpler device.

Alternatively, a delay time arbitration formula is used to determine the more complex device within the IEEE 1394-1995 serial bus network of devices which will take assignment of the newly-connected simpler device. Using the delay time arbitration formula, each more complex device calculates a delay value, based on its number of currently assigned simpler devices and address value within the network of devices. The more complex device within the network of devices having the lowest delay value will take assignment of the newly-connected simpler device.

Using either the priority arbitration formula or the delay time arbitration formula, the more complex device with the least number of assigned simpler devices is assigned the newly-connected simpler device. If more than one of the more complex device have an equal number of assigned simpler devices which is the least number of assigned simpler devices, then the address value for each of the more complex devices determines which of the more complex devices will take assignment of the newly-connected simpler device.

In the preferred embodiment of the present invention, the number of simpler devices currently assigned to a more complex device and the node identifier of the more complex device are used to calculate a priority value for each more complex device. The priority values for each of the more complex devices within the network of devices are then used to determine which of the more complex devices will take assignment of a newly-connected simpler device. Preferably, the priority value for a more complex device is calculated using the following priority arbitration equation:

$$P(i) = \frac{Ai+1}{(Ai+1)Ni+1} \quad (1)$$

In this priority arbitration equation, the priority value P(i) is equal to the priority of the respective more complex device. An address value Ai is equal to the node identifier of the respective more complex device. Within the IEEE 1394-1995 serial bus network, each node is assigned a node identifier between zero and sixty-two. A responsibility value Ni represents the number of simpler devices currently assigned to the respective more complex device.

Using this priority arbitration equation, each more complex device preferably calculates its own priority value P(i). When a new simpler device is added to the IEEE 1394-1995 serial bus network, each of the more complex devices starts the arbitration process by exchanging its priority value P(i) with the other more complex devices within the network. Preferably, the more complex device with the highest priority value P(i) will take responsibility for the newly-connected simpler device. This priority arbitration equation ensures that the more complex devices within the network will each have different priority values P(i). The more complex device with the lowest number of simpler devices assigned to it will have the highest priority value P(i) and will take assignment of a newly-connected simpler device. As the number of simpler devices assigned to a more complex device increases, the priority value of that more complex device will decrease. If a more complex device is connected to the network after existing more complex devices have been assigned simpler devices, the newly-connected more complex device will start with a responsibility value Ni equal to zero and will thus have the highest priority of the more complex devices within the network. This newly-connected more complex device will take assignment of newly-connected simpler devices until its responsibility value Ni is equal to the lowest responsibility value Ni of the other more complex devices within the network. When more than one of the more complex devices have the lowest responsibility value Ni within the network, then the address value Ai determines the highest priority value and which one of the more complex devices with the lowest responsibility value Ni will have the highest priority value P(i) and be assigned a newly-connected simpler device.

In an alternate embodiment of the present invention, the number of simpler devices assigned to a more complex device and the node identifier of the more complex device are used to calculate a delay value for each more complex device. The delay value for a more complex device will determine when the more complex device begins the arbitration for a newly-connected simpler device. Accordingly, the more complex device with the lowest delay time value will take assignment of a newly-connected simpler device. The delay value for each of the more complex devices is calculated using the following priority arbitration equation:

$$T(i) = \left(Ni + \frac{1}{Ai+1}\right) UNIT \quad (2)$$

In this delay arbitration equation, the delay value T(i) is equal to the delay time of the respective more complex device. An address value Ai is equal to the node identifier of the respective more complex device. As described above, within the IEEE 1394-1995 serial bus network, each node is assigned a node identifier between zero and sixty-two. A responsibility value Ni represents the number of simpler devices currently assigned to the respective more complex device. A unit is equal to a designated time value.

Using this delay arbitration equation, each more complex device calculates its own delay value T(i). When a simpler device is added to the IEEE 1394-1995 serial bus network, each more complex device will begin the arbitration process after waiting its respective delay time. The more complex device with the lowest delay value T(i) will begin the arbitration process the earliest and will take assignment of the newly-connected simpler device. This delay arbitration equation ensures that the more complex devices within the network will each have different delay values T(i). The more complex device with the lowest number of simpler devices assigned to it will have the lowest delay value T(i) and will take assignment of a newly-connected simpler device. As the number of simpler devices assigned to a more complex device increases, the delay value of the more complex device will increase. If a more complex device is connected to the network after existing more complex devices have been assigned simpler devices, the newly-connected more complex device will start with a responsibility value Ni equal to zero and will thus have the lowest priority of the more complex devices within the network. This newly-connected more complex device will take assignment of newly-connected simpler devices until its responsibility value Ni is equal to the lowest responsibility value Ni of the other more complex devices within the network. When more than one of the more complex devices have the lowest responsibility value Ni within the network, then the address value Ai determines the differences in the delay values for each more complex device and which one of the more complex devices with the lowest responsibility value Ni will have the lowest delay value T(i) and be assigned a newly-connected simpler device.

An exemplary network configuration including a video camera 10, a video cassette recorder 14, a computer system 18 and a smart television 19 coupled together by IEEE 1394-1995 serial busses 12, 16 and 17, is illustrated in FIG. 1. The IEEE 1394-1995 serial bus 12 couples the video camera 10 to the video cassette recorder 14, allowing the video camera 10 to send data to the video cassette recorder 14 for recording. Through the IEEE 1394-1995 serial bus 12, the video cassette recorder 14 is also able to send communications to the video camera 10. The IEEE 1394-1995 serial bus 16 couples the video cassette recorder 14 to the computer system 18, allowing the video cassette recorder 14 to send data to the computer system 18 for display and allowing the computer system 18 to send communications to the video cassette recorder 14. Through the IEEE 1394-1995 serial busses 12 and 16, the computer system 18 is also able to send and receive communications from the video camera 10. The IEEE 1394-1995 serial bus 17 couples the video cassette recorder 14 to the smart television 19 allowing the video cassette recorder 14 to send data to the smart television 19 for display. Through the IEEE 1394-1995 serial busses 12 and 17, the smart television 19 is also able to send communications to and receive communications from the video camera 10. Preferably, the IEEE 1394-1995 serial busses 12, 16 and 17 are IEEE 1394-1995 serial busses. It should however be apparent to those skilled in the art that any other appropriate bus or network configuration may be used to couple the devices together.

Figure 2:
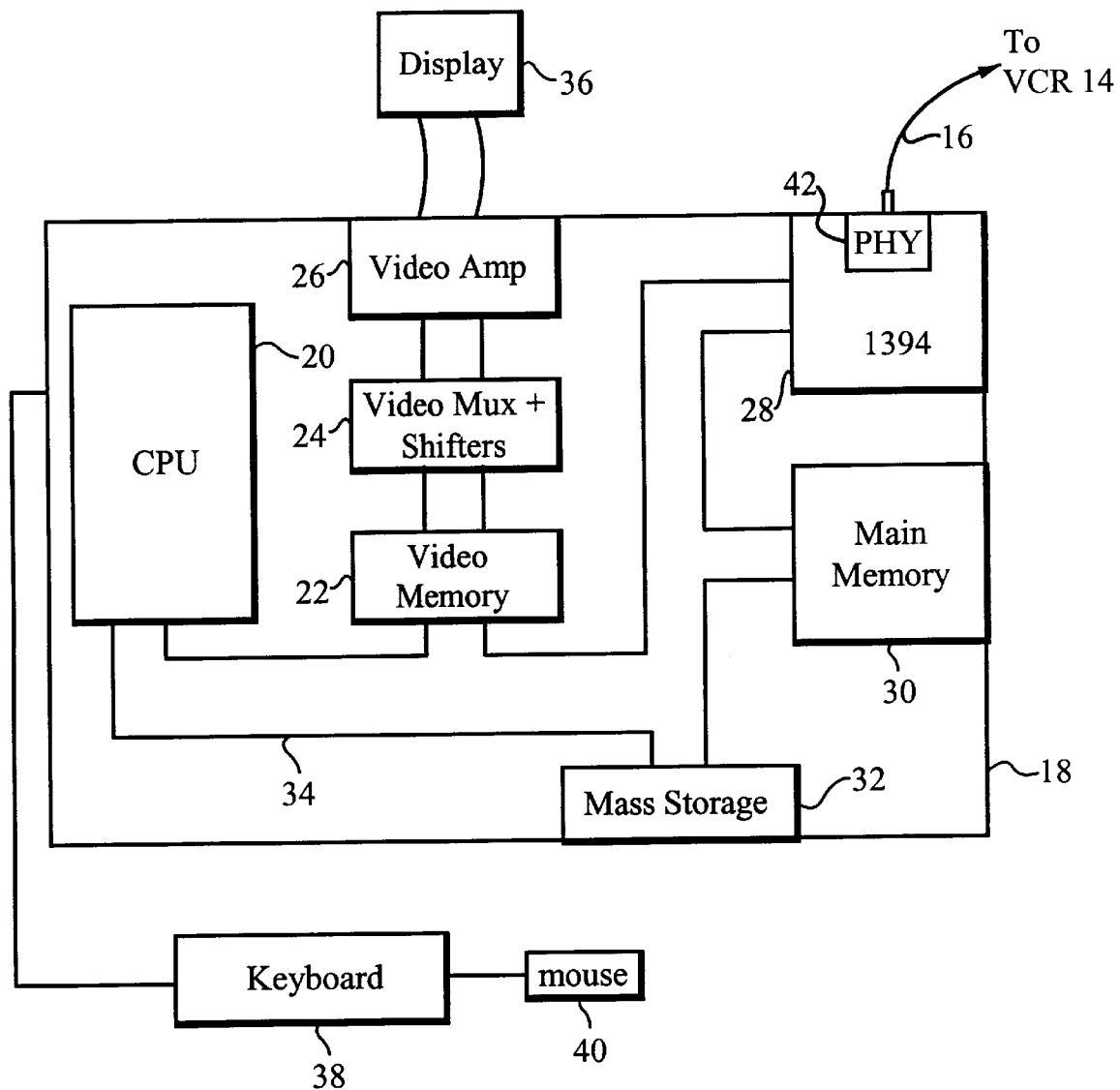
FIG. 2 illustrates a block diagram schematic of relevant components within the computer system of FIG. 1.

A block diagram of the internal components of the computer system 18 is illustrated in FIG. 2. The computer system 18, as a more complex device, includes a central processor unit (CPU) 20, a main memory 30, a video memory 22, a mass storage device 32 and an IEEE 1394-1995 interface circuit 28, all coupled together by a conventional bidirectional system bus 34. The interface circuit 28 includes the physical interface circuit 42 for sending and receiving communications on the IEEE 1394-1995 serial bus. The physical interface circuit 42 is coupled to the video cassette recorder 14 over the IEEE 1394-1995 serial bus cable 16. In the preferred embodiment of the present invention, the interface circuit is implemented on an IEEE 1394-1995 interface card within the computer system 18. However, it should be apparent to those skilled in the art that the interface card 28 can be implemented within the computer system 18 in any other appropriate manner, including building the interface circuit onto the motherboard itself. The mass storage device 32 may include both fixed and removable media using any one or more of magnetic, optical or magneto-optical storage technology or any other available mass storage technology. The system bus contains an address bus for addressing any portion of the memory 22 and 30. The system bus 34 also includes a data bus for transferring data between and among the CPU 20, the main memory 30, the video memory 22, the mass storage device 32 and the interface circuit 28.

The computer system 18 is also coupled to a number of peripheral input and output devices including the keyboard 38, the mouse 40 and the associated display 36. The keyboard 38 is coupled to the CPU 20 for allowing a user to input data and control commands into the computer system 10. A conventional mouse 40 is coupled to the keyboard 38 for manipulating graphic images on the display 36 as a cursor control device.

A port of the video memory 22 is coupled to a video multiplex and shifter circuit 24, which in turn is coupled to a video amplifier 26. The video amplifier 26 drives the display 36. The video multiplex and shifter circuitry 24 and the video amplifier 26 convert pixel data stored in the video memory 22 to raster signals suitable for use by the display 36.

Figure 3:
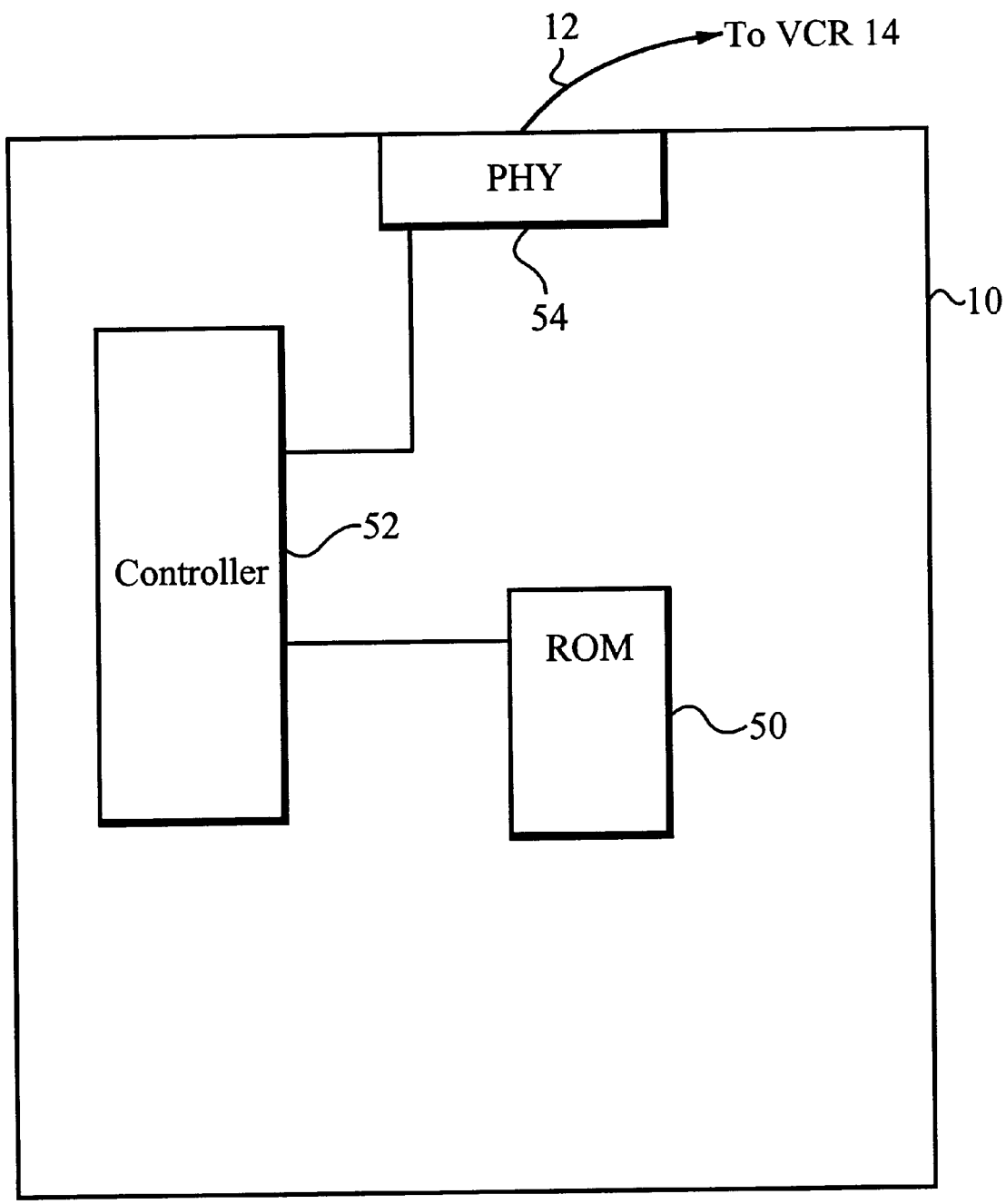
FIG. 3 illustrates a block diagram schematic of relevant components within the video camera of FIG. 1.

A block diagram of the relevant components within the video camera 10 is illustrated in FIG. 3. As a simpler device, the video camera 10 includes a bus interface circuit 54, a controller circuit 52 and a read-only memory (ROM) 50. The bus interface circuit 54 for interfacing the device 10 to the IEEE 1394-1995 serial bus 12 and controlling the communications over the IEEE 1394-1995 serial bus 12 is coupled to the controller circuit 52. The controller circuit 52 controls the operation of the device 10 and the components included within the device. A ROM 50 for storing self-describing information and necessary instructional code is coupled to the controller 52. It should be apparent that the device 10 includes additional components not shown within FIG. 3. Within the preferred embodiment of the present invention, the ROM 50 includes self-describing information as taught within U.S. patent application Ser. No. 09/092,703 filed on Jun. 4, 1998 and entitled METHOD AND APPARATUS FOR INCLUDING SELF-DESCRIBING INFORMATION WITHIN DEVICES, which is hereby incorporated by reference. Within the preferred embodiment, this self-describing information is used by the more complex device to which the simpler device is assigned to control and provide an interface to the simpler device.

Within the exemplary network illustrated in FIG. 1, there are two more complex devices, the computer system 18 and the smart television 19, and two simpler devices, the video camera 10 and the video cassette recorder 14. As an example, the video camera 10 has a node identifier value within the network of zero (0), the video cassette recorder 14 has a node identifier value within the network of one (1), the smart television 19 has a node identifier value within the network of two (2) and the computer system 18 has a node identifier value within the network of three (3). The video camera 10 is assigned to the more complex smart television 19 and the video cassette recorder 14 is assigned to the more complex computer system 18.

Figure 4:
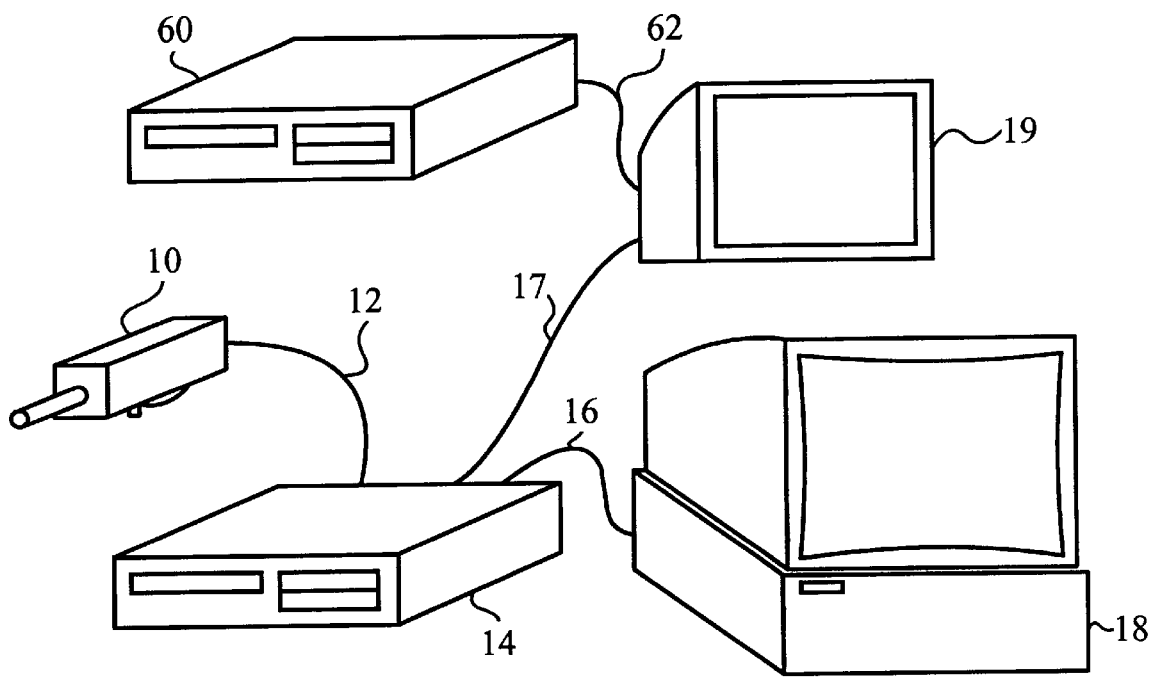
FIG. 4 illustrates an exemplary network configuration of devices including a computer system, a smart television, a video camera, a first video cassette recorder and a second video cassette recorder.

FIG. 4 illustrates an exemplary network configuration of devices having the same devices illustrated in FIG. 1 with the addition of a second video cassette recorder 60. The second video cassette recorder 60 is coupled to the smart television 19 by the IEEE 1394-1995 cable 62. When an additional simpler device, such as the video cassette recorder 60, is added to the network of devices, the two more complex devices 18 and 19 will preferably each calculate a priority value P(i), using equation (1) above. The computer system 18, with one simpler device currently assigned to it and an address value equal to three (3), has a priority value P(i) equal to 0.80. The smart television 19, with one simpler device currently assigned to it and an address value equal to two (2), has a priority value P(i) equal to 0.75. Once the more complex devices 18 and 19, within the network of devices, each calculate their corresponding priority value P(i), they then each share that priority value P(i) with the other more complex devices within the network. After determining that the computer system 18 has the highest priority value P(i), the computer system 18 will then take assignment of the newly connected video cassette recorder 60.

In the configuration illustrated in FIG. 4, when an additional simpler device is added to the network of devices, the two more complex devices 18 and 19 will again preferably each calculate a priority value P(i), using equation (1) above. The computer system 18, now with two simpler devices assigned to it and an address value equal to three (3), has a priority value P(i) equal to 0.444. The smart television 19, still with one simpler device currently assigned to it and an address value equal to two (2), has a priority value P(i) equal to 0.75. After determining that the smart television 19 now has the highest priority value P(i), the smart television 19 will then take assignment of the next connected simpler device.

Within an alternate embodiment of the present invention, when an additional simpler device, such as the video cassette recorder 60, is added to the network of devices, as illustrated in FIG. 4, the two more complex devices 18 and 19 will preferably each calculate a delay value T(i), using equation (2) above. The computer system 18, with one simpler device currently assigned to it and an address value equal to three (3), has a delay value T(i) equal to 1.25 Units. Each unit is equal to a designated time value, such as one microsecond. It should be apparent to those skilled in the art, that each unit can be equal to any appropriate unit of time. The smart television 19, with one simpler device currently assigned to it and an address value equal to two (2), has a delay value T(i) equal to 1.333 Units. Once the more complex devices 18 and 19, within the network of devices, each calculate their corresponding delay value T(i), they then each wait a time period equal to the delay value before beginning arbitration for the newly-connected simpler device. Accordingly, the computer system 18 will begin arbitration for the newly-connected video cassette recorder 60 first and will take assignment of the video cassette recorder 60.

In this alternate embodiment, within the configuration illustrated in FIG. 4, when an additional simpler device is added to the network of devices, the two more complex devices 18 and 19 will again preferably each calculate a delay value T(i), using equation (2) above. The computer system 18, now with two simpler devices assigned to it and an address value equal to three (3), has a delay value T(i) equal to 2.25 Units. The smart television 19, still with one simpler device currently assigned to it and an address value equal to two (2), has a delay value T(i) equal to 1.333 Units. Accordingly, the smart television 19 will begin arbitration for the next-connected simpler device first and will take assignment of the next connected simpler device.

Preferably, the apparatus for providing self-sustained even arbitration of the present invention is distributed among the more complex devices within a network of devices. Alternatively, it should be apparent to those skilled in the art that a single more complex device within the network of devices can be an arbiter and be responsible for calculating priority or delay values for each of the more complex devices within the network. This arbiter device is then also responsible for determining the more complex device having the highest priority value or the lowest delay value and assigning responsibility for the newly-connected simpler device to the more complex device having the highest priority value or the lowest delay value.

The method of providing self-sustained even arbitration within an IEEE 1394-1995 serial bus network of devices of the present invention controls the arbitration and assignment of newly-connected simpler devices to more complex devices. The priority arbitration formula is preferably used to determine the more complex device within an IEEE 1394-1995 serial bus network of devices which will take assignment of a newly-connected simpler device. Alternatively, the delay time arbitration formula is used to determine the more complex device within an IEEE 1394-1995 serial bus network of devices which will take assignment of a newly-connected simpler device. Using either of the priority arbitration formula or the delay time arbitration formula, a more complex device with the lowest number of currently assigned simpler devices will take assignment of a newly-connected simpler device. If more than one of the more complex devices have an equal number of assigned simpler devices which is the lowest number of currently assigned simpler devices, then the address value of the more complex devices determines which of the more complex devices with the lowest number of currently assigned simpler devices will take assignment of a newly-connected simpler device. The self-sustained even arbitration method of the present invention will evenly distribute responsibility and control of the simpler devices within a network among the more complex devices within the network. The self-sustained even arbitration method of the present invention also allows a later connected more complex device to be assigned simpler devices until the later connected more complex device has the same number of assigned simpler devices as the earlier connected more complex devices.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures.

I claim:

1. A method of arbitrating responsibility for a task among a plurality of devices comprising:
   a. determining a responsibility value for each of the plurality of devices, wherein the responsibility value is determined using a number of currently assigned tasks and an address value for a corresponding one of the plurality of devices;
   b. assigning responsibility for the task to one of the plurality of devices having a lowest responsibility value, if only one of the plurality of devices has the lowest responsibility value; and
   c. assigning responsibility for the task to one of the plurality of devices having the lowest responsibility value based on the address value for each of the plurality of devices having the lowest responsibility value, if more than one of the plurality of devices have the lowest responsibility value.

2. The method as claimed in claim 1 wherein the task represents a newly-connected simpler device and the number of currently assigned tasks represents a number of currently assigned simpler devices.

3. The method as claimed in claim 2 wherein the one of the plurality of devices having the lowest responsibility value and a highest address value is assigned responsibility for the task, if more than one of the plurality of devices have the lowest responsibility value.

4. The method as claimed in claim 3 wherein the plurality of devices include more complex devices having a central processing unit and internal memory.

5. The method as claimed in claim 4 wherein the plurality of devices and the simpler devices are coupled together within an IEEE 1394-1995 serial bus network.

6. An apparatus for arbitrating responsibility for a task among a plurality of devices comprising:
   a. means for determining a responsibility value for each of the plurality of devices, wherein the responsibility value is determined using a number of currently assigned tasks and an address value for a corresponding one of the plurality of devices; and
   b. means for assigning coupled to the means for determining for assigning responsibility for the task to a selective one of the plurality of devices having a lowest responsibility value, if only one of the plurality of devices has the lowest responsibility value, and based on the address value for each of the plurality of devices having the lowest responsibility value, if more than one of the plurality of devices have the lowest responsibility value.

7. The apparatus as claimed in claim 6 wherein the task represents a newly-connected simpler device and the number of currently assigned tasks represents a number of currently assigned simpler devices.

8. The apparatus as claimed in claim 7 wherein the one of the plurality of devices having the lowest responsibility value and a highest address value is assigned responsibility for the task, if more than one of the plurality of devices have the lowest responsibility value.

9. The apparatus as claimed in claim 8 wherein the plurality of devices include more complex devices having a central processing unit and internal memory.

10. The apparatus as claimed in claim 9 wherein the apparatus is included within an IEEE 1394-1995 serial bus network.

11. A method of arbitrating and assigning responsibility for simpler devices to more complex devices within a network of devices comprising:
   a. determining a responsibility value for each of the more complex devices, wherein the responsibility value is equal to a number of currently assigned simpler devices for a corresponding more complex device;
   b. determining a priority value for each of the more complex devices based on a corresponding responsibility value and address value for each of the more complex devices; and
   c. assigning responsibility for a newly-connected simpler device to one of the more complex devices having a highest priority value.

12. The method as claimed in claim 11 wherein the one of the more complex devices having the highest priority value is the more complex device having a lowest responsibility value, if only one of the more complex devices has the lowest responsibility value, and having the lowest responsibility value and a highest address value, if more than one of the more complex devices has the lowest responsibility value.

13. The method as claimed in claim 12 wherein each of the more complex devices include a central processing unit and internal memory.

14. The method as claimed in claim 13 wherein the more complex devices and the simpler devices are coupled together within an IEEE 1394-1995 serial bus network.

15. A method of arbitrating and assigning responsibility for simpler devices to more complex devices within a network of devices comprising:
   a. determining a responsibility value for each of the more complex devices, wherein the responsibility value is equal to a number of currently assigned simpler devices for a corresponding more complex device;
   b. determining a delay value based on corresponding responsibility value and address value for each of the more complex devices; and
   c. assigning responsibility for a newly-connected simpler device to one of the more complex devices having a lowest delay value.

16. The method as claimed in claim 15 wherein assigning responsibility includes each of the more complex devices waiting for a time period represented by a corresponding delay value and then beginning arbitration for responsibility of the newly-connected simpler device after the time period, wherein the more complex device having the lowest delay value begins arbitration first and takes assignment of responsibility of the newly-connected simpler device.

17. The method as claimed in claim 16 wherein the one of the more complex devices having the lowest delay value is the more complex device having a lowest responsibility value, if only one of the more complex devices has the lowest responsibility value, and having the lowest responsibility value and a highest address value, if more than one of the more complex devices has the lowest responsibility value.

18. The method as claimed in claim 17 wherein each of the more complex devices include a central processing unit and internal memory.

19. The method as claimed in claim 18 wherein the more complex devices and the simpler devices are coupled together within an IEEE 1394-1995 serial bus network.

20. A network of devices including one or more simpler devices and a plurality of more complex devices, wherein each of the more complex devices comprises:
   a. a network interface component to communicate with other devices within the network of devices; and
   b. an apparatus to arbitrate and assign responsibility for simpler devices to more complex devices including:
      i. a determining component for determining a responsibility value for the more complex device, wherein the responsibility value is determined using a number of simpler devices currently assigned to the more complex device and an address value of the more complex device; and
      ii. a controlling component coupled to the determining component for taking assignment of a newly-connected simpler device, if the more complex device has a lowest responsibility value, if only one of the more complex devices has the lowest responsibility value, and having the lowest responsibility value and a highest address value, if more than one of the more complex devices has the lowest responsibility value.

21. The network of devices as claimed in claim 20 wherein each of the more complex devices further comprises a central processing unit and internal memory.

22. The network of devices as claimed in claim 21 wherein the network interface circuit is configured to couple to an IEEE 1394 serial bus network.

* * * * *